(12) United States Patent
Chou

(10) Patent No.: US 7,174,366 B2
(45) Date of Patent: Feb. 6, 2007

(54) METHOD AND SYSTEM FOR PARSING E-MAIL

(75) Inventor: Peter Chou, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 630 days.

(21) Appl. No.: 10/271,789

(22) Filed: Oct. 17, 2002

(65) Prior Publication Data

US 2004/0024825 A1 Feb. 5, 2004

(30) Foreign Application Priority Data

Aug. 1, 2002 (TW) .............................. 91117372 A

(51) Int. Cl.
*G06F 15/16* (2006.01)

(52) U.S. Cl. ...................... 709/206; 709/203

(58) Field of Classification Search ........ 709/200–203, 709/206, 217, 218–220, 223–224, 227
See application file for complete search history.

(56) References Cited

U.S. PATENT DOCUMENTS

| | | | | |
|---|---|---|---|---|
| 5,903,723 A * | 5/1999 | Beck et al. | ................. | 709/200 |
| 6,226,670 B1 * | 5/2001 | Ueno et al. | ................. | 709/207 |
| 6,356,633 B1 * | 3/2002 | Armstrong | ............. | 379/265.11 |
| 6,405,244 B1 * | 6/2002 | Bando et al. | ................ | 709/206 |
| 6,453,338 B1 * | 9/2002 | Shiono | ........................ | 709/206 |
| 6,473,787 B2 * | 10/2002 | Miloslavsky | ................ | 709/206 |
| 6,505,236 B1 * | 1/2003 | Pollack | ........................ | 709/206 |
| 6,581,105 B2 * | 6/2003 | Miloslavsky et al. | ........ | 709/238 |
| 6,732,156 B2 * | 5/2004 | Miloslavsky | ................ | 709/206 |
| 6,732,273 B1 * | 5/2004 | Byers | ........................ | 713/193 |
| 6,816,885 B1 * | 11/2004 | Raghunandan | ............. | 709/206 |
| 6,839,741 B1 * | 1/2005 | Tsai | ........................... | 709/217 |
| 6,981,020 B2 * | 12/2005 | Miloslavsky et al. | ........ | 709/204 |

FOREIGN PATENT DOCUMENTS

| | | |
|---|---|---|
| CN | 1200516 A | 12/1998 |
| EP | 0881587 A2 | 12/1998 |

* cited by examiner

*Primary Examiner*—Moustafa M. Meky
(74) *Attorney, Agent, or Firm*—Nath & Associates PLLC; Harold L. Novick

(57) ABSTRACT

A method and system for parsing e-mail, and said system comprises a database and a server. The server is used to receive a e-mail, then parse and extract the content of the received e-mail, and lastly store the data extracted from the e-mail into the database. The server further includes a parsing unit, a notifying unit and a setting unit. The parsing unit is used to parse the e-mail, and extract the data according to preset key words. The notifying unit is used to inform the original sender, who sent the e-mail, and the notifying unit will generate a notification when the parsing unit extracts the specified data. The setting unit is used to modify the key word setting used in the parsing unit.

11 Claims, 3 Drawing Sheets

METHOD AND SYSTEM FOR PARSING E-MAIL

BACKGROUND OF THE INVENTION

1. Field of the Invention

This invention generally relates to the field of the application of e-mail. More particularly, the present invention relates to a method and system for parsing an e-mail, and then automatically transferring the data included in the e-mail into a database.

2. Description of the Prior Art

The Internet deeply influences the delivering and processing of information worldwide, and provides a channel for rapidly delivering multi-media data. So far there are various services provided on the Internet, most common is the WWW (World Wide Web), e-mail and BBS. Users directly extract articles published on the WWW through a browser and multi-media interaction. The e-mail service provides a similar mail system as the real world, users send an e-mail to the receiver's mailbox on the Internet, which only the owner of that box, with the password, can read this e-mail. No matter where the user or the box is, the mail will be delivered in seconds. The convenience reached by Internet e-mail service changes the method of sending messages in real world.

Therefore, in real world applications, e-mail service has become the tool and channel accepted by people for sending messages. In the present day, e-mail has become the efficient digital tool for saving time and money in mail delivery. However, after a user writes and sends information by using e-mail, the receiver can't rapidly make use of the information recorded in the e-mail. If the user wants to extract the information contained in the e-mail, he/she must manually review the content of the email.Accordingly, the user can't efficiently process and use the useful information contained in the e-mail.

For example, an enterprise needs a systematic approach to deal with a personal resume in employee recruitment. Most job seekers send their resume via a manpower agency (or manpower bank) through the Internet. The manpower agency usually composes the job seeker's resume in a HTML (Hypertext Markup Language) format, and then sends it to a specific e-mail account owned by the enterprise through e-mail service. However it can't directly transfer the resume into the format according to an inner resume database of the enterprise. The resumes sent from the manpower agency or manpower bank must be reviewed and the information in the resumes are manually keyed into the resume database of the enterprise for further information processing. Consequently, the manual transformation of the resume wastes too much time and human resources.

Therefore, the present invention provides a method and system for parsing an e-mail that is written by HTML, and then automatically transferring the data included in the e-mail into a database. The increased speed of extracting the included data and the simplification in the handling procedure of traditional e-mails is for the sole purpose of reducing human resources.

SUMMARY OF THE INVENTION

According to the shortcoming mentioned in the background, the present invention provides a system and method for parsing an e-mail to improve the foregoing disadvantage.

Accordingly, the main object of the present invention is to parse the content of an e-mail.

Another object of the present invention is to simplify the procedure of e-mail processing, and reduce human resources.

Another object of the present invention is to automatically transfer and save date into a database.

Another object of the present invention is to notify associated staff when specified data is saved into the database.

In accordance with the present invention, a method and system for parsing e-mail, the said system comprises a database and a server. The server is used to receive e-mail, then parse and extract the content of the received e-mail, lastly store the data extracted from the e-mail into the database. The server further includes a parsing unit, a notifying unit and setting unit. The parsing unit is used to parse the e-mail, and extract data according to a presetting key word. The notifying unit is used to inform the original sender, who sends the e-mail, besides the notifying unit will generate a notification when the parsing unit extracts the specified data. The setting unit is used to modify the key word setting used in the parsing unit.

The method for parsing the content of the e-mail mentioned above, transforms the e-mail that's edited in HTML into a text file, and then deletes the unnecessary spaces and codes of the text file. Next, the text file is searched to find a pair of matching tags according to a presetting key word, and then the data contained between the pair of tags is extracted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The preferred embodiments of the present invention will now be described in greater detail. Nevertheless, it should be noted that the present invention can be practiced in a wide range of other embodiments besides those explicitly described, and the scope of the present invention is expressly not limited except as specified in the accompanying claims.

The present invention provides a method and system for parsing a e-mail, the said system comprising a database and a server. The server is used to receive a e-mail, then parse and extract the content of the received e-mail, and lastly store the data extracted from the e-mail into the database. The server further includes a parsing unit, a notifying unit and a setting unit. The parsing unit is used to parse the e-mail, and extract data according to presetting key words. The notifying unit is used to inform the original sender, who sends the e-mail, besides the notifying unit will generate a notification when the parsing unit extracts the specified data. The setting unit is used to modify the key word setting that's adapted by the parsing unit.

The method for parsing the content of the e-mail mentioned above is to transform the e-mail that's edited in HTML into a text file, and then delete the unnecessary spaces and codes of the text file. Next, the text file is searched to find a pair of matching tags to a preset key word, and then the data contained between the pair of tags is extracted.

Figure 1:
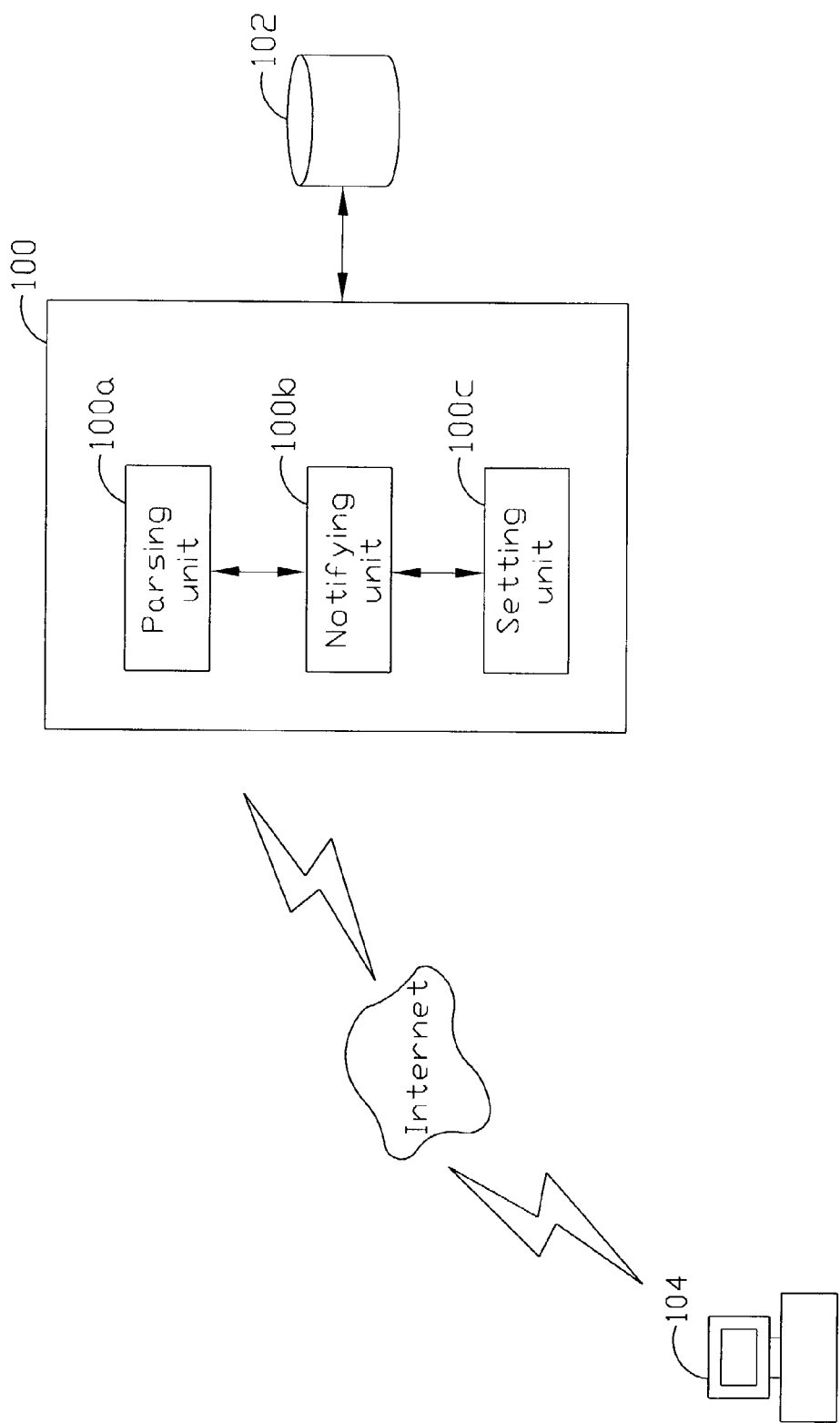
FIG. 1 shown the system configuration of the e-mail parsing system according to the present invention.

FIG. 1 illustrates a system configuration of the e-mail parsing system. A server 100 is used to receive a e-mail and a database 102 is linked to the server 100. The data parsed from the e-mail by the server 100 will be saved in database 102. The server 100 receives the e-mail through a network; the network can be the Internet or LAN (local area network). In this preferred embodiment, the server 100 receives the e-mail of a resume that is sent from a manpower agency, the e-mail resume is edited in the HTML (Hypertext Markup Language) format, the computer 104 can be deemed a host to send the e-mail for the manpower agency.

As shown in FIG. 1, the server 100 at least includes a parsing unit 100a, notifying unit 100b and setting unit 100c. The parsing unit 100a parses the e-mailed resume sent from manpower agency, and saves the extracted data into the database 102. The notifying unit 100b generates a notification to inform the job seeker after the server 100 received the resume of the job seeker. The setting unit 100c is used to set the key words for the parsing process and sets the corresponding fields of the database 102.

Furthermore, the server 100 immediately parse the e-mail after receiving, or by way of scheduling; parsing the received e-mail on a specified time just following the schedule.

Figure 2:
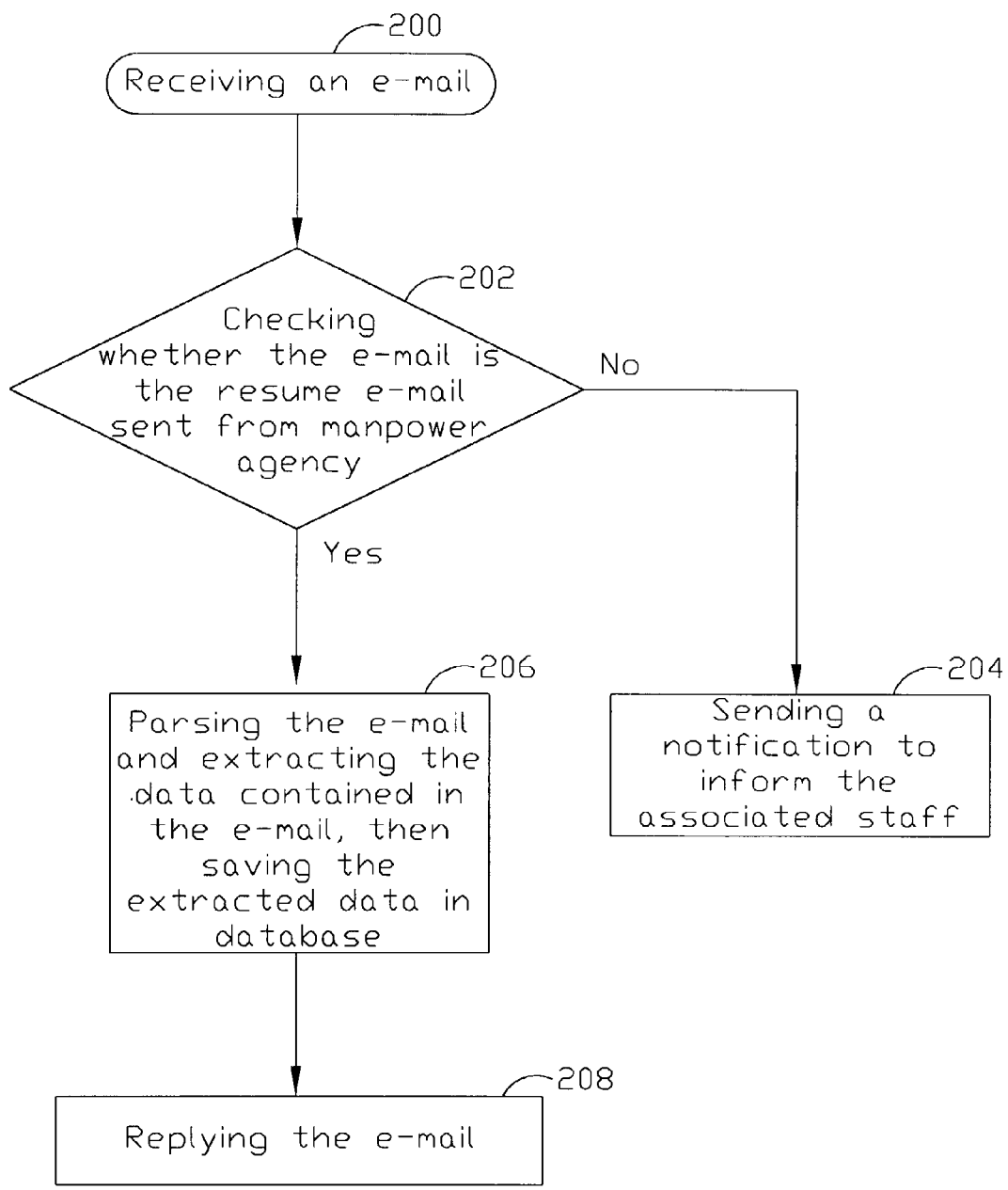
FIG. 2 shown the flow chart of the processing procedure of the e-mail parsing system according to the present invention.

FIG. 2 is the flow chart of the procedure of the e-mail parsing system. When the server receives a e-mail (step 200), the server first checks whether the e-mail is a resume sent from a manpower agency (step 202). If not, a notification will be sent to inform the associated staff by the notifying unit 100b for other processes (step 204). If this is a resume e-mail, it is then parsed and the data contained is extracted through the parsing unit 100a, and saved into database (step 206). Finally the notifying unit 100b informs the job seeker that the resume e-mail has been received (step 208).

Figure 3:
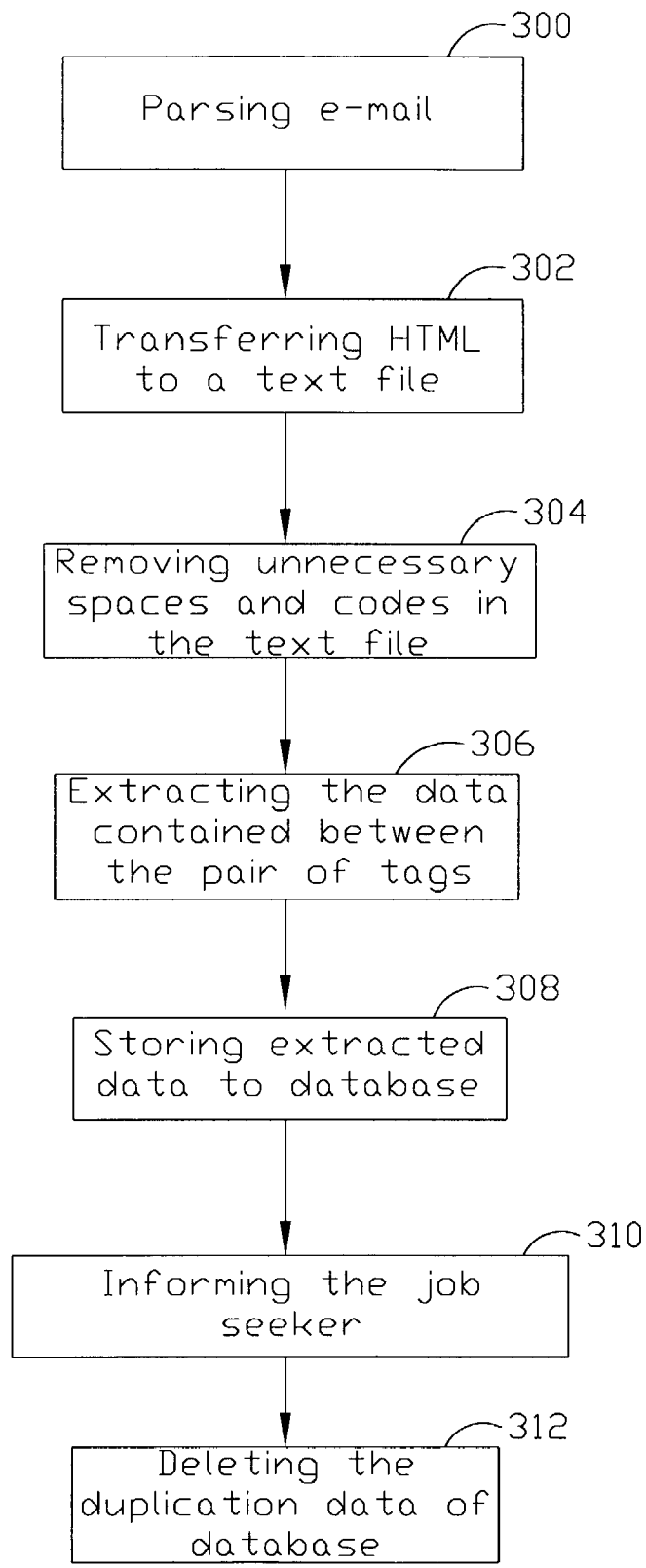
FIG. 3 shown the processing procedure of parsing an e-mail according to the present invention.

FIG. 3 illustrates the processing procedure of parsing a e-mail, and begins the parsing of the e-mail after its received (step 300). Furthermore, the e-mail is edited by HTML format, the feature of the HTML document is that pair of tags composes the document. The information of HTML documents contained between a pair of tags, for example:

```
<person>
    <name>Bill</name>
    <age>25</age>
    <sex>male</sex>
</person>
```

A portion of a HTML document is shown above, where individual tags are used to identify the different meaning content, therefore when the parsing unit 100a parses this HTML document, the data "Bill", "25" and "male" will be extracted through key words "name", "age" and "sex".

Accordingly, the resume e-mail edited in HTML is transformed into a text file (step 302), and the unnecessary spaces and codes among the text file (step 304) are removed for parsing to the parsing unit 100a. The unnecessary spaces are constructed for the readability of HTML document during HTML document authoring. The unnecessary codes for annotating or controlling purposes, thus, can be removed to increase the speed of parsing.

Next, the text file is searched to find a pair of matching tags with preset key words. Then the data contained between the pair of tags 306 is extracted, herein the key word can be set by the setting unit 100c as shown in FIG. 1. The setting unit 100c is also used to set the relation of the database. Therefore, the parsing unit 100a performs parsing according to the presetting key word, and then stores the extracted data into the assigned data fields of the database (step 308).

The notifying unit 100b will inform the job seeker and the related staff when the parsing procedure is completed (step 310), according to the extracted data. The database also scans and deletes the duplicated data as the newest data (step 312).

Therefore, the present invention provides a method and system for parsing a e-mail. Then the data included in the e-mail is transferred into a database to automatically increase the speed of extracting the included data, and too simplify the procedure of the traditional e-mail process, for the purpose of reducing human resources and automation.

Although preferred embodiment has been illustrated and described, it will be obvious to those skilled in the art that various modifications may be made without departing from what is intended to be limited solely by the appended claims.

What is claimed is:

1. A system for parsing e-mail, said system comprising:
   a database;
   a server for receiving an e-mail edited in format of Hyper Text Markup Language and parsing the content of said e-mail to extract text data from said email according to at least one presetting key word, and then storing said text data extracted from said e-mail into an assigned field of said database, said server comprising:
   a parsing unit for parsing said e-mail and extracting said text data contained in said e-mail according to said presetting key word;
   a notifying unit for informing a sender, and sending a notification when said parsing unit extracting a specified data; and
   a setting unit for setting and changing said presetting key word that is used within said parsing unit.

2. The system according to claim 1, wherein said server parses received e-mail at assigned time in way of scheduling.

3. The system according to claim 1, wherein said server parses e-mail immediately.

4. The system according to claim 1, wherein the steps of parsing said e-mail comprise:
   transforming said e-mail into a text file;
   removing unnecessary spaces and codes in said text file;
   searching said text file to find out a pair of tags matched said presetting key word; and
   extracting a data contained between said pair of tags.

5. A method of parsing e-mail, wherein said e-mail is edited in format of Hyper Text Markup Language, the steps of said method comprising:
   transforming said e-mail into a text file;
   removing unnecessary spaces and codes in said text file;
   searching said text file to find out a pair of tags matched a presetting key word;
   extracting a data contained between said pair of tags; and
   storing said data in an assigned field of database.

6. The method according to claim 5, further comprising sending an acknowledgement to a sender who sent said e-mail after storing said data.

7. The method according to claim 5, wherein said presetting keyword can be resetting depend on searched data.

8. A method of parsing e-mail, said method comprising:
receiving an e-mail edited in format of Hyper Text Markup Language;
checking the source of said e-mail;
extracting text data contained in said e-mail according to at least one presetting key word;
transforming said e-mail into a text file;
removing unnecessary spaces and codes in said text file;
searching said text file to find out a pair of tags matched said presetting key word;
extracting a data contained between said pair of tags; and
storing said extracted data.

9. The method according to claim 8, wherein said extracted data is stored in a specified database.

10. The method according to claim 8, wherein said presetting key word can be resetting depend on searched data.

11. The method according to claim 8, wherein said e-mail is received by a server, and said server comprising:
a parsing unit for parsing said e-mail and extracting data contained in said e-mail according to presetting key word;
a notifying unit for informing a sender, and sending a notification when said parsing unit extracting a specified data; and
a setting unit for setting and changing said key word that is used within said parsing unit.

* * * * *